(12) United States Patent
Swanson

(10) Patent No.: US 7,058,778 B2
(45) Date of Patent: Jun. 6, 2006

(54) MEMORY CONTROLLERS HAVING PINS WITH SELECTABLE FUNCTIONALITY

(75) Inventor: Travis Swanson, Ramsey, MN (US)

(73) Assignee: Micron Technology, Inc., Boise, ID (US)

( * ) Notice: Subject to any disclaimer, the term of this patent is extended or adjusted under 35 U.S.C. 154(b) by 436 days.

(21) Appl. No.: 09/943,320

(22) Filed: Aug. 30, 2001

(65) Prior Publication Data

US 2003/0046507 A1 Mar. 6, 2003

(51) Int. Cl.
*G06F 12/00* (2006.01)

(52) U.S. Cl. .................... 711/170; 711/105

(58) Field of Classification Search ........... 711/105, 711/170
See application file for complete search history.

(56) References Cited

U.S. PATENT DOCUMENTS

| | | | | |
|---|---|---|---|---|
| 5,301,278 A | * | 4/1994 | Bowater et al. | 711/5 |
| 5,375,084 A | * | 12/1994 | Begun et al. | 365/63 |
| 5,860,134 A | * | 1/1999 | Cowell | 711/172 |
| 5,893,136 A | * | 4/1999 | Stolt et al. | 711/105 |
| 6,298,426 B1 | * | 10/2001 | Ajanovic | 711/172 |
| 6,530,007 B1 | * | 3/2003 | Olarig et al. | 711/167 |
| 6,625,685 B1 | * | 9/2003 | Cho et al. | 711/5 |
| 6,681,301 B1 | * | 1/2004 | Mehta et al. | 711/154 |
| 2001/0047450 A1 | * | 11/2001 | Gillingham et al. | 711/105 |
| 2001/0054135 A1 | * | 12/2001 | Matsuda | 711/167 |

* cited by examiner

*Primary Examiner*—B. James Peikari
*Assistant Examiner*—Woo H. Choi
(74) *Attorney, Agent, or Firm*—Fish & Neave IP Group of Ropes & Gray LLP

(57) ABSTRACT

Systems and methods for selecting pin functionality in memory controllers are provided. These memory controllers have pins that can be used to drive different types of signals, depending on the type of memory coupled to the memory controller. For example, pins can be used to drive clock signals or chip select signals. Accordingly, because different types of memory require different numbers of clock and chip select signals, the same memory controller can be advantageously used with different types of memory. Moreover, memory controller pins that would ordinarily go unused with some types of memory can now be used to increase the number of such memories that can be coupled to the memory controller.

30 Claims, 3 Drawing Sheets

MEMORY CONTROLLERS HAVING PINS WITH SELECTABLE FUNCTIONALITY

BACKGROUND OF THE INVENTION

This invention relates to memory controllers. More particularly, this invention relates to providing different signal functionality on the same pins of memory controller circuits.

Computer circuits typically include a CPU (central processing unit) and at least one memory controller, which controls communications between the CPU and various memory components. Computer circuits are usually implemented on a printed circuit board where board space is often an important design consideration. One way to save space is to reduce the pin count on integrated circuit chip packages. One way to reduce pin count on chip packages is to reuse, where possible, the same pins for multiple purposes.

Reduction of pin count is often sought in memory controller circuits because they are generally larger chip packages. However, the advent of wide address/data paths and of numerous types of memories that need to be accommodated by memory controller circuits has resulted in an increase in the number of pins on memory controller chip packages. Moreover, although memory controller circuits are designed to accommodate various types of memories, and can therefore be used in different types of computer circuits, such as, for example, workstations and personal computers, not all applications will include those types of memories. This may result in unused memory controller chip package pins, thus wasting valuable circuit board space.

In view of the foregoing, it would be desirable to provide a memory controller that can be coupled to different types of memories without requiring additional memory controller pins or resulting in unused pins.

SUMMARY OF THE INVENTION

It is an object of this invention to provide a memory controller that can be coupled to different types of memories without requiring additional memory controller pins or resulting in unused pins.

In accordance with the present invention, at least some pins of a memory controller are used to provide multiple types of signals. The type of signal provided by a memory controller pin depends on the type of memory coupled to the memory controller. Clock signals and chip select signals are among the signal types that can be provided by the same memory controller pins. For example, when the memory controller is coupled to memories (e.g., buffered memory modules) that do not require as many clock signal pins as are available, the unused clock signal pins can be selected to operate as additional chip select pins. This change in functionality may allow additional memories to be coupled to the memory controller. Selection of the functionality of memory controller pins may, for example, occur upon initialization of the memory controller in a computer circuit.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention includes selectable functionality of memory controller pins that preferably depends on the type of memory used. Memory controller pins that are required when one type of memory is coupled to the memory controller may not be required when other types of memory are coupled to the memory controller. These unused pins can be advantageously used to drive other signals, such as additional chip select signals, which can result in additional memory being coupled to the controller.

Memory modules are of at least two types: unbuffered and buffered. Unbuffered memory modules typically do not include built-in PLLs (Phase Locked Loops) or input latches. When memory controllers are coupled to unbuffered memory modules, they typically drive control, address, and data signals to each individual memory on the memory modules. When memory modules are coupled to buffered modules, registers on the buffered modules latch control, address, and data signals received by the memory modules. In addition, PLLs on buffered memory modules can reduce system loading on clocks supplied to memory modules, because the PLLs regenerate clocks for distribution to each memory on the memory modules.

Memory controllers are typically designed to accommodate a specific number of memory modules. When a memory controller is designed to accommodate a specific number of unbuffered memory modules, a corresponding number of pins are used on the memory controller to interface with the unbuffered memory modules. When the memory controller is also designed to accommodate buffered memory modules, many of the same pins used to interface with unbuffered memory modules are used to interface with the buffered memory modules as well.

However, some of the pins that interface with the unbuffered memory modules may not be required when buffered memory modules are used. For example, fewer clock signal pins may be required to interface with a buffered memory module, because clock signals are buffered and regenerated on buffered memory modules. Pins that are left unused in buffered memory module applications are advantageously reused in accordance with the present invention.

In one embodiment of the present invention, pins that are left unused when the memory controller is coupled to buffered memory modules are constructed as dual function pins. These pins may either drive chip select signals or clock signals. When buffered memories, which require fewer clock signals, are coupled to the memory controller, the dual function pins are used as chip select pins to drive additional buffered memory modules. The reuse of memory controller pins advantageously increases the number of buffered memory modules that can be coupled to the memory controller without increasing the number of memory controller pins.

Figure 1:
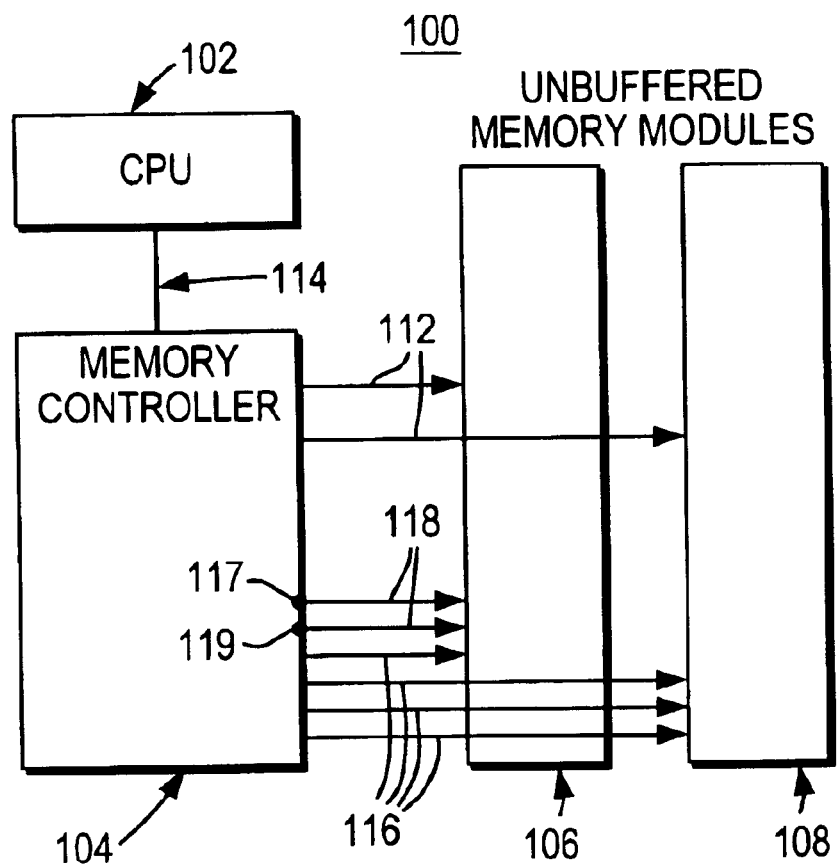
FIG. 1 is a block diagram of a preferred embodiment of a memory controller coupled to unbuffered memory modules according to the present invention.

FIG. 1 shows computer system 100 which includes CPU 102, memory controller 104, and unbuffered memory modules 106 and 108. CPU 102 is preferably coupled to memory controller 104 with host bus 114. In other embodiments of the present invention, memory controller 104 is packaged in the same chip package as CPU 102. Memory controller 104 is coupled to unbuffered memory modules 106 and 108 with chip select signals 112, clock signals 116, clock signals 118 (which are provided by dual function pins 117 and 119), address bus signals, data bus signals, and other control signals (not shown). As illustrated in FIG. 1, unbuffered memory modules require one chip select signal per module and three clock signals per module. In other embodiments, unbuffered memory modules may require two chip select and six clock signals per module, which would be provided by another embodiment of a memory controller of the present invention.

Figure 2:
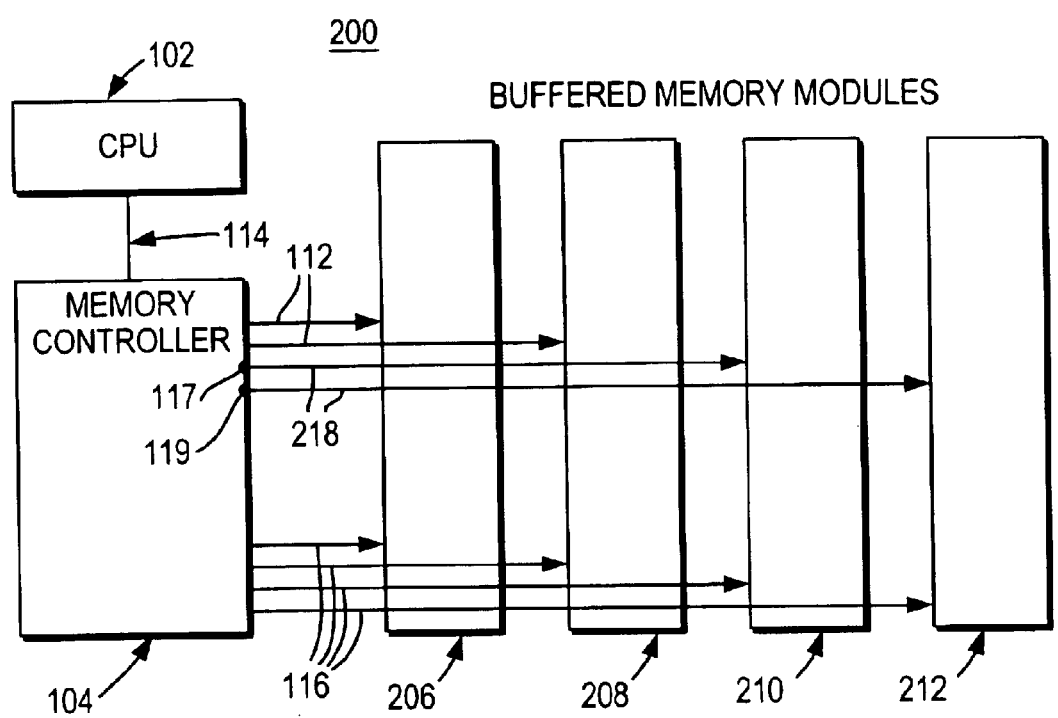
FIG. 2 is a block diagram of a preferred embodiment of a memory controller coupled to buffered memory modules according to the present invention.

Advantageously, memory controller 104 can support twice as many buffered memory modules as unbuffered memory modules, as shown in FIG. 2. In computer system 200, memory controller 104 is coupled to buffered memory modules 206, 208, 210, and 212 with chip select signals 112 and 218 (formerly clock signals 118), clock signals 116, address bus signals, data bus signals, and other control signals (not shown). In this embodiment, buffered memory modules require one chip select signal per module and one clock signal per module. In other embodiments, buffered memory modules may each require two chip select signals and a differential clock pair, which would be provided by another embodiment of a memory controller of the present invention.

Figure 3:
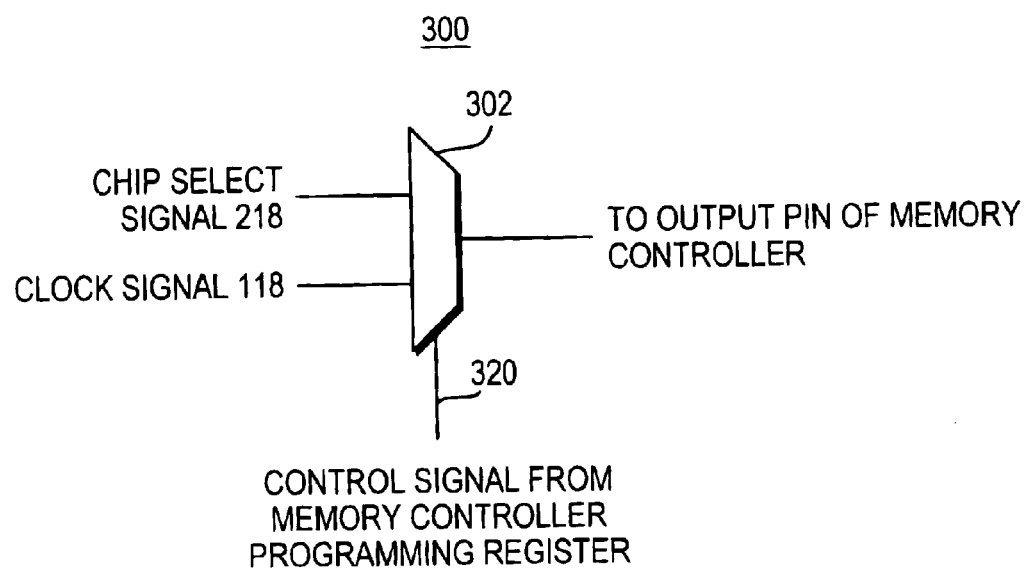
FIG. 3 is a block diagram of a preferred embodiment of a multiplexer used to select output pin functionality of a memory controller according to the present invention.

As shown in FIGS. 1 and 2, memory controller 104 can provide either clock signals 118 or chip select signals 218 at pins 117 and 119. In order to drive either clock signals or chip select signals from pins 117 and 119, clock and chip select signals are preferably multiplexed as illustrated in FIG. 3.

Multiplexer circuit 300 includes multiplexer 302 which receives chip select signal 218 and clock signal 118 as inputs. The output of multiplexer 302 is selected by a control signal 320 received from, for example, a programming register of memory controller 104. The control signal can select the chip select signal to be output to an output pin of memory controller 104 when memory controller 104 is programmed to interface with buffered memory modules. When memory controller 104 is programmed to interface with unbuffered memory modules, the clock signal can be selected to be output to the same output pin of memory controller 104.

In another embodiment of the invention, the memory modules are DDR (Double Data Rate) memory modules. DDR memories are synchronous memories in which data access is timed with differential input clocks. DDR memories typically output data on both falling and rising edges of the input clock. A memory controller constructed in accordance with the invention can accommodate both unbuffered and buffered DDR memory modules as now described.

The differential clock inputs of unbuffered DDR memory modules can be driven by differential clock signals from dual purpose clock/chip select output pins of the memory controller. In the same embodiment, when buffered DDR memory modules are coupled to the memory controller, fewer differential clock signals are required to drive the buffered DDR memory modules. For example, three pairs of differential clock signals may be required to drive each unbuffered DDR memory module, as opposed to one pair for each buffered DDR memory module. In accordance with the invention, the unused differential clock signal pins can be programmed to be chip select signal pins. This programming (or selection) can occur, for example, upon memory controller or system initialization. The additional chip select signal pins can then be used to accommodate additional buffered DDR memory modules. For example, if two chip select signals are required for each DDR memory module (unbuffered or buffered), two pairs of unused differential clock signal pins may result in the accommodation of two additional buffered DDR memory modules.

Thus it is seen that memory controllers are provided that can accommodate different types and numbers of memories without increasing the number of memory controller pins needed or resulting in unused pins. One skilled in the art will appreciate that the present invention can be practiced by other than the described embodiments, which are presented for purposes of illustration and not of limitation, and the present invention is limited only by the claims which follow.

I claim:

1. A method of configuring a memory controller, said memory controller having a plurality of input/output pins, said method comprising:

informing said memory controller of a type of memory; and configuring at least one of said pins to have a functionality in accordance with said type of memory, said functionality including control, chip select, and clock functions.

2. The method of claim 1 wherein said type of memory is a buffered memory.

3. The method of claim 1 wherein said type of memory is an unbuffered memory.

4. The method of claim 2, wherein said configuring comprises configuring said functionality of said pin to a clock signal function.

5. The method of claim 4 wherein said clock signal function is a differential clock signal function.

6. The method of claim 1 wherein said configuring comprises configuring said functionality of said pin to a chip select signal function.

7. The method of claim 1 wherein said functionality of said pin is one of a chip select signal and a clock signal.

8. A method of providing more than one function for an output pin of a memory controller, said method comprising:

providing a clock signal within said memory controller;

providing a control signal within said memory controller;

selecting within said memory controller one of said clock signal and said control signal based on a type of memory; and coupling said selected signal to said output pin.

9. The method of claim 8 wherein said type of memory is a buffered memory.

10. The method of claim 8 wherein said type of memory is an unbuffered memory.

11. The method of claim 8 wherein said clock signal is a differential clock signal.

12. A memory controller comprising:

at least one output pin;

a multiplexer having two inputs, a control input, and an output coupled to said output pin;

a chip select signal coupled to one of said two inputs;

a control signal coupled to the other one of said two inputs; and a signal coupled to said control input that selects one of said chip select signal and said control signal based on a type of memory.

13. The memory controller of claim 12 wherein said type of memory is a buffered memory.

14. The memory controller of claim 12 wherein said type of memory is an unbuffered memory.

15. The memory controller of claim 12 wherein said clock signal is a differential clock signal.

16. A memory controller comprising:

at least one output pin; and circuitry coupled to said output pin that provides said output pin with selectable functionality in accordance with a type of memory, said functionality including control, chip select, and clock functions.

17. The memory controller of claim 16 wherein said functionality of said output pin is one of a chip select signal and a clock signal.

18. A memory circuit comprising:

a plurality of memory modules, said memory modules being of at least one type; and a memory controller coupled to said memory modules via a plurality of pins, at least one of said pins having a selectable functionality based on said type of said memory modules, said functionality including control, chip select, and clock functions.

19. The memory circuit of claim 18 wherein said selectable functionality comprises a clock signal.

20. The memory circuit of claim 18 wherein said selectable functionality comprises a chip select signal.

21. A computer system comprising:

a central processing unit;

a memory controller coupled to said central processing unit, said memory controller having a plurality of input/output pins; and a plurality of memory modules of at least one type coupled to said memory controller via said pins; wherein:

a subset of said pins has selectable functionality, said functionality based on said type of said memory modules, said functionality including control, chip select, and clock functions.

22. The computer system of claim 21 wherein selection of the clock function provides a clock signal.

23. The computer system of claim 21 wherein selection of the chip select function provides a chip select signal.

24. Apparatus for configuring a memory controller, said memory controller having a plurality of input/output pins, said apparatus comprising:

means for informing said memory controller of a type of memory; and means for configuring at least one pin of said memory controller to have a functionality in accordance with said type of memory, said functionality including control, chip select, and clock functions.

25. Apparatus for providing more than one function for an output pin of a memory controller, said apparatus comprising:

means for providing a clock signal within said memory controller;

means for providing a control signal within said memory controller;

means for selecting within said memory controller one of said clock signal and said control signal based on a type of memory; and means for coupling said selected signal to said output pin.

26. A memory controller comprising:

at least one output pin;

multiplexer means for outputting one of at least two signals to said output pin;

signal means for selecting a chip, said signal means coupled to said multiplexer means;

control signal means coupled to said multiplexer means; and means coupled to said multiplexer means for selecting said control signal means based on a type of memory.

27. A memory controller comprising:

at least one output pin;

multiplexer means having two inputs, a control input, and an output coupled to said output pin;

a clock signal coupled to one of said two inputs;

a control signal coupled to the other one of said two inputs; and means coupled to said control input for selecting one of said clock signal and said control signal based on a type of memory.

28. A memory controller comprising:

at least one output pin; and means for providing said output pin with selectable functionality in accordance with a type of memory, said functionality including control, chip select, and clock functions.

29. A memory circuit comprising:

a plurality of memory modules, said memory modules being of at least one type; and memory controller means coupled to said memory modules via input/output means, at least some of said input/output means having a selectable functionality based on said type of said memory modules, said functionality including control, chip select, and clock functions.

30. A computer system comprising:

central processing means;

memory controller means coupled to said central processing means, said memory controller means having a plurality of input/output means;

a plurality of memory modules of at least one type coupled to said memory controller means via said input/output means; wherein:

a subset of said input/output means has selectable functionality, said functionality based on said type of said memory modules and including control, chip select, and clock functions.

* * * * *

UNITED STATES PATENT AND TRADEMARK OFFICE
CERTIFICATE OF CORRECTION

PATENT NO.       : 7,058,778 B2
APPLICATION NO. : 09/943320
DATED            : June 6, 2006
INVENTOR(S)      : Travis Swanson It is certified that error appears in the above-identified patent and that said Letters Patent is hereby corrected as shown below:

Col. 4 Claim 1, line 17, before "said method" insert --wherein at least one of said pins has selectable functionality,--;
    line 21, after "pins" insert --having said selectable functionality--;
Col. 4 Claim 4, line 28, change "2" to --1--;
Col. 4 Claim 8, line 41, replace "control" with --chip select--;
    line 43, replace "control" with --chip select--;
Col. 4 Claim 12, line 53, replace "at least one" with --an--;
    line 56, replace "a control signal" with --a clock signal--;
    line 60, insert before "signal" --control--;
    line 61, replace "control" with --clock--;
Col. 5 Claim 16, line 4, replace "at least one" with --an--;
    lines 6-8, replace "selectable functionality in accordance with a type of memory, said functionality including control chip select, and clock function" with --a function selected in accordance with a type of memory, said circuitry operative to select one of at least a chip select function and a clock function--;
Col. 5 Claim 17, lines 9-11, replace "said functionality of said output pin is one of a chip select signal and a clock signal" with --selection of the chip select function provides a chip select signal to said output pin; and wherein selection of the clock function provides a clock signal to said output pin--;
Col. 5 Claim 18, lines 18-19, replace "functionality including control, chip select, and clock functions" with --memory controller operative to select a chip select function and a clock function for each of said at least one of said pins having the selectable functionality--;
Col. 5 Claim 19, lines 20-21, replace "said selectable functionality comprises" with --selection of the clock function provides--;
Col. 5 Claim 20, lines 22-23, replace "said selectable functionality comprises" with --selection of the chip select function provides--;
Col. 5 Claim 21, lines 32-35, replace "a subset of said pins has selectable functionality, said functionality based on said type of said memory modules, said functionality including control, chip select, and clock functions" with --each one of a subset of said pins has selectable functionality, said selectable functionality based on said type of said memory modules, said selectable functionality including a chip select function and a clock function--;
Col. 5 Claim 24, lines 47-48, replace "said type of memory, said functionality including control, chip select, and clock functions" with --said type of memory, each of said at least one pin configurable by said means for configuring having selectable functionality including a chip select function and a clock function--;

UNITED STATES PATENT AND TRADEMARK OFFICE
CERTIFICATE OF CORRECTION

PATENT NO. : 7,058,778 B2
APPLICATION NO. : 09/943320
DATED : June 6, 2006
INVENTOR(S) : Travis Swanson It is certified that error appears in the above-identified patent and that said Letters Patent is hereby corrected as shown below:

Col. 5 Claim 25, line 54, replace "control" with --chip select--;
Col. 6 Claim 26, line 6, replace "at least one" with --an--;
    line 9, insert --for selecting-- after "means";
    line 13, insert --one of-- after "selecting"; delete "control"
    line 14, insert --for selecting and said clock signal means-- after "means";
    line 16, replace "at least one" with --an--;
    line 20, replace "control" with --chip select--;
    line 23, replace "control" with --chip select--;
Col. 6 Claim 28, line 26, replace "at least one" with --an--;
    lines 28-30, replace "said functionality including control, chip select, and clock functions" with --said selectable functionality including a chip select function and a clock function--;
    line 35, replace "at lease some" with --one--;
    line 37, insert --selectable-- after "said";
    lines 38-39, replace "said functionality including control, chip select, and clock functions" with --said selectable functionality including a chip select function and a clock function--;
Col. 6 Claim 30, line 48, insert --each one of-- before "a subset of...";
    lines 49-51, replace "said functionality based on said type of said memory modules and including control, chip select, and clock functions" with --said selectable functionality based on said type of said memory modules and including a chip select function and a clock function--

Signed and Sealed this

Fifth Day of August, 2008

JON W. DUDAS
*Director of the United States Patent and Trademark Office*